United States Patent
Park et al.

(10) Patent No.: US 9,036,759 B2
(45) Date of Patent: May 19, 2015

(54) METHOD AND APPARATUS FOR PERFORMING SYNCHRONIZATION BETWEEN DEVICES

(71) Applicant: Samsung Electronics Co., Ltd., Gyeonggi-do (KR)

(72) Inventors: Seung-Hoon Park, Seoul (KR); Chi-Woo Lim, Gyeonggi-do (KR); Nam-Yoon Lee, Seoul (KR); Kyung-Kyu Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 94 days.

(21) Appl. No.: 13/659,496

(22) Filed: Oct. 24, 2012

(65) Prior Publication Data
US 2013/0108000 A1 May 2, 2013

(30) Foreign Application Priority Data
Oct. 27, 2011 (KR) .......................... 10-2011-0110802

(51) Int. Cl.
| | | |
|---|---|---|
| H04L 7/04 | (2006.01) | |
| H04W 4/00 | (2009.01) | |
| H04J 3/06 | (2006.01) | |

(52) U.S. Cl.
CPC ............. *H04W 4/005* (2013.01); *H04J 3/0676* (2013.01); *H04J 3/0602* (2013.01)

(58) Field of Classification Search
USPC .......................................... 375/362, 354, 350
See application file for complete search history.

(56) References Cited

U.S. PATENT DOCUMENTS

| | | | | |
|---|---|---|---|---|
| 5,128,632 | A * | 7/1992 | Erhart et al. | 331/1 A |
| 6,366,574 | B1 * | 4/2002 | Baissus et al. | 370/350 |
| 2003/0232606 | A1 * | 12/2003 | Akahori | 455/123 |
| 2008/0310566 | A1 * | 12/2008 | Tsuruta et al. | 375/350 |
| 2009/0117916 | A1 * | 5/2009 | Jo | 455/456.1 |
| 2010/0190517 | A1 | 7/2010 | Wang et al. | |
| 2011/0019601 | A1 | 1/2011 | Li et al. | |

FOREIGN PATENT DOCUMENTS

EP 1 936 837 6/2008

OTHER PUBLICATIONS

Mohamed Ben Hadj Rhouma et al., "Self-Organization of Pulse-Coupled Oscillators with Application to Clustering", IEEE Transactions on Pattern Analysis and Machine Intelligence, XP-001005761, vol. 23, No. 2, Feb. 1, 2001.

(Continued)

*Primary Examiner* — Eva Puente
(74) *Attorney, Agent, or Firm* — The Farrell Law Firm, P.C.

(57) ABSTRACT

A method performed by a device for performing synchronization between devices for a Device-to-Device (D2D) communication is provided. The method includes setting, according to a process of the device, the device to a group of devices for performing a dynamic switching; outputting a synchronization signal corresponding to the set group as a signal for setting synchronization in a physical layer; controlling, upon receiving another synchronization signal from another device, the outputting of the synchronization signal by applying a time offset according to a relation between the set group that includes the device and the group that includes the another device; and setting, if the synchronization signal and the another synchronization signal are converged, synchronization of the device based on a time point where the synchronization signal is output.

19 Claims, 7 Drawing Sheets

(56) References Cited

OTHER PUBLICATIONS

Hichem Frigui et al., "Clustering Based on Synchronization of Pulse-Coupled Oscillators", 19th International Conference of the North American Fuzzy Information Processing Society, XP-010515898, Jul. 13, 2000.

Yu Niu et al., "General Criteria-Based Clustering Method for Sensor Network", 2011 International Conference on Network Computing and Information Security, IEEE Computer Society, XP-032004292, May 14, 2011.

* cited by examiner

METHOD AND APPARATUS FOR PERFORMING SYNCHRONIZATION BETWEEN DEVICES

PRIORITY

This application claims priority under 35 U.S.C. §119(a) to Korean Application Serial No. 10-2011-0110802, which was filed in the Korean Intellectual Property Office on Oct. 27, 2011, the entire content of which is incorporated herein by reference.

BACKGROUND OF THE INVENTION

1. Field of the Invention

The present invention relates generally to data communication technology, and more particularly, to a method and apparatus for performing synchronization with respect to a device included in a data communication network.

2. Description of the Related Art

Due to the recent increased usage of smart phones, data traffic is rapidly increasing. The Korea Communications Commission has reported that the accelerated increase in usage of smart phones has caused a threefold increase mobile data traffic during the past year. It is expected that smart phone users will further increase usage of application services in their smart phones, which would increase traffic much further beyond the current traffic level. Especially, object intelligence communications that utilize objects, such as communications between a human and an object and communications between objects, which correspond to new mobile markets, are increasingly being performed in addition to previous communications between human beings. Accordingly, traffic transmitted to an evolved node B is expected to increase to a level that cannot be adequately supported with current infrastructures.

Therefore, there is a need for technologies capable of addressing such problems. One such technology, involves direct communication between devices in a mobile communication network. This technology, which is called Device-to-Device (D2D) communication, corresponds to a convergence between mobile communication technology and Machine-to-Machine (M2M) technology, which can increase the traffic capacity of an evolved node B and reduce overload of the evolved node B. The D2D communication refers to a communication in which User Equipments (UEs) within the same cell or cells adjacent to each other establish a D2D link between them and directly exchange data with each other through the D2D link, without passing the data through an evolved node B.

D2D communication schemes include a scheme that uses the same frequency as that used by an evolved node B and is performed either under the control of the evolved node B or while receiving support of the evolved node B, and a scheme that controls communication between UEs (devices), which use a frequency different from that of an evolved node B and independently perform D2D communications. The D2D scheme that involves controlling communication between devices requires a procedure for setting synchronization between the devices, and in such a scheme, the devices typically set synchronization between themselves by using time information received from a synchronous evolved node B or received through a Global Positioning System (GPS) reception module. However, when the devices set synchronization between themselves by using time information received from a synchronous evolved node B or received through a GPS reception module, the devices are inevitably required to access the synchronous evolved node B or the GPS reception module. However, some communication schemes provided by communication providers may not support a synchronous evolved node B. In such cases, it may be impossible to set synchronization between devices by using time information received from a synchronous evolved node B. Further, when a device is located in a GPS shaded area (i.e., an area with poor GPS reception, such as an area between high-story buildings, an area within a tunnel, an indoor area of a building, etc.), the device may be unable to receive time information from a GPS and be thus unable to set synchronization between devices. Eventually, when a device is unable to smoothly access a synchronous evolved node B or a GPS reception module as described above, the device is unable to start the D2D communication.

SUMMARY OF THE INVENTION

An aspect of the present invention is to substantially address at least the above problems and/or disadvantages and to provide at least the advantages below. Accordingly, an aspect of the present invention is to provide a method and an apparatus, which can effectively perform synchronization between devices without using a separate module for receiving time information.

According to an aspect of the present invention, a method performed by a device for performing synchronization between devices for a Device-to-Device (D2D) communication is provided. The method includes setting, according to a process of the device, the device to a group of devices for performing a dynamic switching; outputting a synchronization signal corresponding to the set group as a signal for setting synchronization in a physical layer; controlling, upon receiving another synchronization signal from another device, the outputting of the synchronization signal by applying a time offset according to a relation between the set group that includes the device and the group that includes the another device; and setting, if the synchronization signal and the another synchronization signal are converged, synchronization of the device based on a time point where the synchronization signal is output.

According to another aspect of the present invention, a device for performing a Device-to-Device (D2D) communication is provided. The device includes a controller for setting, according to a process of the device, the device to a group of devices for performing a dynamic switching; and a synchronization controller for outputting a synchronization signal corresponding to the set group as a signal for setting synchronization in a physical layer, determining, if another synchronization signal output by another device is received, whether to control the synchronization according a relation between the set group that includes the device and a group that includes the another device, controlling, if the control of synchronization is determined, the outputting of the synchronization signal by applying a time offset according to the relation between the set group that includes the device and the group that includes the another device, and setting, if the synchronization signal and the another synchronization signal are converged, the synchronization of the device based on a time where the synchronization signal is output.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE PRESENT INVENTION

Hereinafter, various embodiments of the present invention are described with reference to the accompanying drawings. In the following description, various specific definitions found in the following description are provided only to help general understanding of the present invention, and it is apparent to those skilled in the art that the present invention can be implemented without such definitions.

In order for network devices to configure a frame structure without a centralized coordinator, such as an evolved node B or an access point, performing a special control procedure, it is necessary to first perform synchronization between the devices and then define a frame structure with respect to a reference time according to the synchronization. In a typical synchronization scheme, network devices initially have their own respective individual time information, which has not been synchronized, exchange the individual time information with each other for synchronization, and then unify the individual time information into one time reference. However, in order for the network devices to exchange the individual time information with each other, the devices need to transmit messages to each other. As a result, it takes considerable amount of time until all network devices can completely know each other's individual information and perform the synchronization procedure. Therefore, such a typical scheme may be improper for a situation in which a network that dynamically changes, such as a situation in which a user device moves.

Therefore, embodiments of the present invention employ a scheme performed through an exchange of signals in a PHYsical (PHY) layer, instead of a scheme that involves exchanging messages in a Media Access Control (MAC) layer. A Pulse-Coupled Oscillator (PCO) synchronization algorithm has been studied as an algorithm relating to synchronization. The PCO synchronization is a phenomenon known in various fields including the communication field and corresponds to a mechanism by which a plurality of entities perform synchronization without centralized control, and various examples thereof have appeared in the fields of chemistry, physics, biology, etc.

After acquiring synchronization between devices by using PCO synchronization, a frame for communication is defined, in order to perform thereafter necessary operations for a D2D service. Also, the conventional PCO synchronization is based on an assumption that a device is in a constant reception state and is thus capable of receiving a synchronization signal from another device. However, in a service according to embodiments of the present invention, a device performs functions including discovery, paging, and traffic transmission, and is unable to receive a synchronization signal of another device while performing the functions, which decreases the performance of the PCO synchronization. In order to overcome this shortcoming, according to embodiments of the present invention, devices are tied into groups, and the groups are arranged to operate at different times, so as to disperse time points for reception of synchronization signals of other devices. According to this method, even when one group is unable to receive a synchronization signal of another device, the other groups are in a reception-capable state, and thus the devices in the reception-capable state can still receive the synchronization signal. Further, since a plurality of groups perform a synchronization procedure for forming a single identical frame structure in spite of different times for originating synchronization signals, interaction between groups can reduce synchronization signal reception errors in one group.

Figure 1:
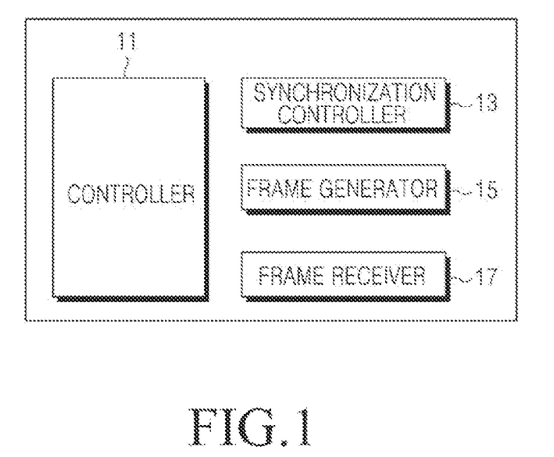
FIG. 1 is a block diagram schematically illustrating a structure of a device according to an embodiment of the present invention.

FIG. 1 is a block diagram schematically illustrating a device according to an embodiment of the present invention. Referring to FIG. 1, a device according to an embodiment of the present invention includes a controller 11, a synchronization controller 13, a frame generator 15, and a frame receiver 17.

The controller 11 controls general operations of the synchronization controller 13, the frame generator 15, and the frame receiver 17. Specifically, the controller 11 controls the synchronization controller 13 to set a synchronization for data transmission and reception, and controls the frame generator 15 to cause the frame generator 15 to generate a data frame including data to be transmitted and a frame for a paging operation or a discovery operation for data transmission and reception.

The controller 11 provides group information of a synchronization signal output by the synchronization controller 13 in consideration of a process of a device. For example, the synchronization signal output by the synchronization controller 13 may be set as a synchronization signal header, a first group synchronization signal, a second group synchronization signal, a third group synchronization signal, . . . , or an $N^{th}$ group synchronization signal.

Further, the process of the device may be set in consideration of one or more combinations of interference information, Quality of Service (QoS), and a service provided by the device.

The synchronization controller 13 generates and transmits a synchronization signal set according to a group type determined by the controller 11. More specifically, the synchronization controller 13 calculates a phase value of the synchronization signal according to passage of time based on a phase-to-time function set for outputting of the synchronization signal. When the calculated phase value exceeds a phase value set in advance for outputting of the synchronization signal, the synchronization controller 13 outputs the synchronization signal at a time point at which the calculated phase value exceeds the preset phase value. In this event, the output synchronization signal corresponds to a group type set by the controller 11. Moreover, when receiving a synchronization signal from another device adjacent to the device (hereinafter, "another synchronization signal"), the synchronization controller 13 controls the outputting of the synchronization signal by applying a time offset according to a relation between a group including the device and a group including the another device, in response to the reception of the another synchronization signal from the another device.

Figure 2:
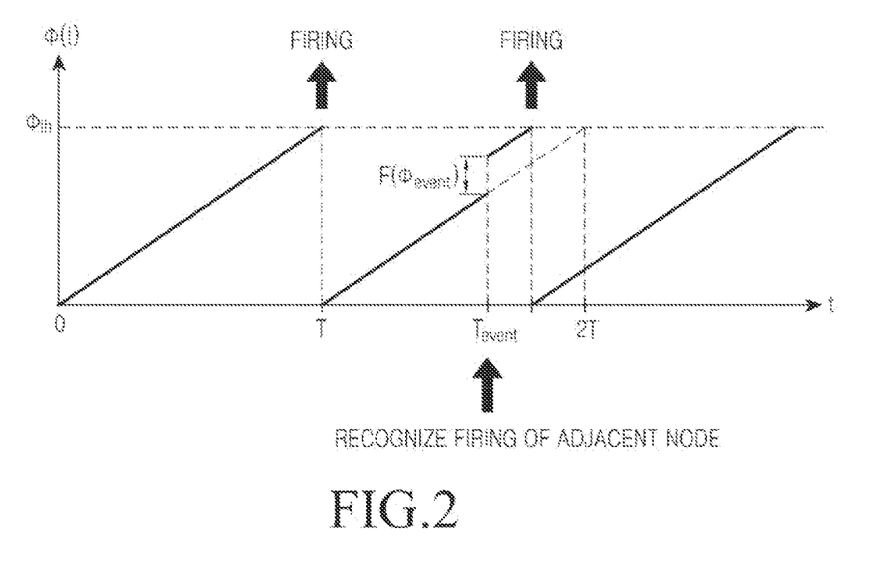
FIG. 2 is a graph illustrating synchronization signal outputting timing based on a phase-to-time phase function set for outputting of a synchronization signal according to an embodiment of the present invention.

FIG. 2 is a graph illustrating synchronization signal outputting timing based on a phase-to-time phase function set for outputting of a synchronization signal according to an embodiment of the present invention.

As illustrated in FIG. 2, the synchronization controller 13 calculates a phase value $\Phi$ of the synchronization signal according to the time, based on the phase-to-time function, (i.e. the function of phase $\Phi$ to time t set for generation of the synchronization signal). Further, when the calculated phase value $\Phi$ exceeds a maximum phase value $\Phi_{Th}$ preset for generation of the synchronization signal, the synchronization controller 13 outputs the synchronization signal at the time point T where the calculated phase value $\Phi$ exceeds the preset maximum phase value $\Phi_{Th}$. The synchronization controller 13 initializes the phase value $\Phi$ and then repeatedly calculates the phase value according to the time. For example, the synchronization controller 13 may calculate the phase value by using a digital counter or an analog oscillator, wherein the maximum phase value $\Phi_{Th}$ may be set to 1 when using an analog oscillator and may be set to (2n−1) when using a digital counter of n bits.

Further, when receiving another synchronization signal from another device adjacent to the device, the synchronization controller 13 controls the outputting of the synchronization signal in response to the reception of the another synchronization signal from the another device. That is, the synchronization controller 13 applies a phase variance $F(\Phi'(t_{event}))$ to the synchronization signal at the time point $t_{event}$, where the device receives the another synchronization signal from the another device. As a result, when the device receives another synchronization signal from the another device, the synchronization controller 13 outputs the synchronization signal faster at time points nT corresponding to an initially set cycle T. Further, as the above-described operation is repeatedly performed, the synchronization controllers 13 included in each of the devices distributed in a network outputs the synchronization signals at times converging on a predetermined time point.

Figure 3A:
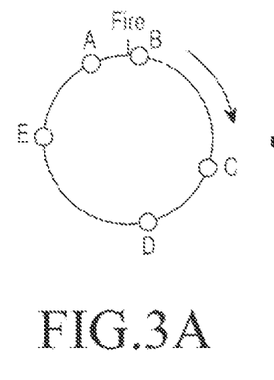
FIGS. 3A to 3C are diagrams illustrating a synchronization signal outputting mechanism by a device according to an embodiment of the present invention.
Figure 3B:
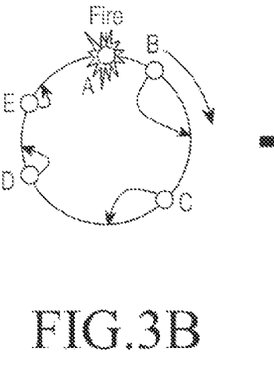
Figure 3C:
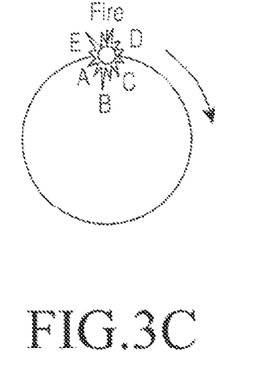

FIGS. 3A to 3C are diagrams illustrating a synchronization signal outputting mechanism by a device according to an embodiment of the present invention.

Referring to FIGS. 3A to 3C, in a network in which first to fifth devices A, B, C, D, and E are distributed as shown in FIG. 3A, the first to fifth devices A, B, C, D, and E have phase values of the synchronization signals indicated by small colored dots at corresponding positions in a time cycle corresponding to the size of the circle. Each device increases the phase value from 0 to the maximum phase value with a predetermined proportion. In the present example according to an embodiment of the present invention, the synchronization signal is output whenever the phase value reaches the maximum phase value (i.e., whenever the device passes a synchronization signal outputting point). Whenever the device passes a synchronization signal outputting point, the synchronization signal is output as shown in FIG. 3B and the phase values of the second to fifth devices B, C, D, and E are then adjusted. In this event, because the adjustment of the phase values of the second to fifth devices B, C, D, and E are based on an output of the phase-to-time function that receives a current phase value of each device as an input, a phase value of a device having a relatively longer amount of time remaining before transmission of the synchronization signals have a relatively larger variance than a phase value of a device having relatively shorter time left before transmission of the synchronization signal. Finally, as illustrated in FIG. 3C, all of the first to fifth devices A, B, C, D, and E generate synchronization signals at a converged time point.

Further, according to an embodiment of the present invention, the synchronization controller 13 may output different synchronization signals according to the types of groups set by the controller 11. Accordingly, in outputting the synchronization signal, the synchronization controller 13 may apply time offsets according to a relation between a group comprised the device and a group including the another device, so that the devices included in the same group converge towards the same phase value, while devices belonging to different groups converge towards time offsets between the groups.

FIGS. 4A to 4D are diagrams illustrating a synchronization signal outputting mechanism by a device according to another embodiment of the present invention.

Figure 4A:
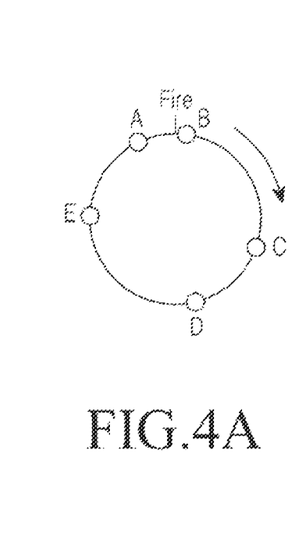
FIGS. 4A to 4D are diagrams illustrating a synchronization signal outputting mechanism by a device according to another embodiment of the present invention.
Figure 4B:
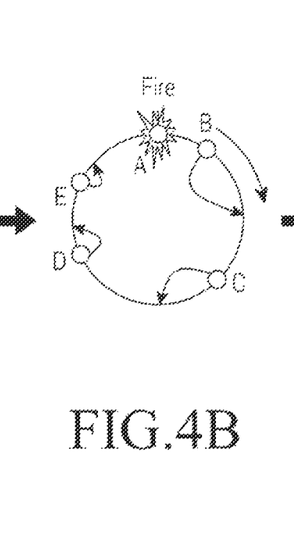
Figure 4C:
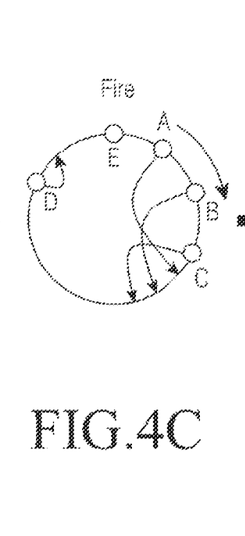
Figure 4D:
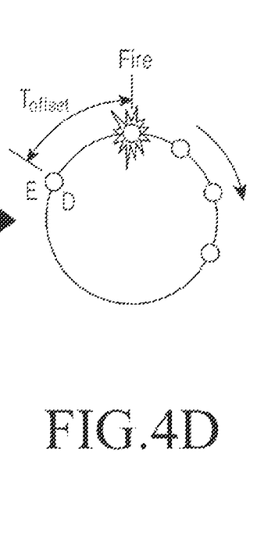

For example, referring to FIGS. 4A to 4C, in a network in which first to fifth devices A, B, C, D, and E are distributed as shown in FIG. 4A, the first to fifth devices A, B, C, D, and E have phase values of the synchronization signals indicated by small dots at corresponding positions in a time cycle corresponding to the size of the circle. Each device increases the phase value from 0 to the maximum phase value with a predetermined proportion. In the present example according to an embodiment of the present invention, the synchronization signal is output whenever the phase value reaches the maximum phase value, that is, whenever the device passes a synchronization signal outputting point. Also, in the present example, the first to third devices A, B, and C output first synchronization signals corresponding to the first group while the fourth and fifth devices D and E output second synchronization signals corresponding to the second group. Further, the first group and the second group have a time offset having a value of $T_{offset}$, so that the synchronization controllers 13 of the devices belonging to the second group cause the phases to converge after passage of a predetermined time, at the second time point following the first group with a space of $T_{offset}$ from the first group. For example, as illustrated in FIG. 4B, the devices included in the first group change their phases by applying the existing function $F(\Phi(t_{event}))$ without change when they detect a first synchronization signal corresponding to the first group, and change their phases by applying a function $F(\Phi(t_{event}-T_{offset}))$, which reflects a value—$T_{offset}$ obtained by subtracting the time point for the first group phase value from the time point for the second group phase value, when they detect a second synchronization signal corresponding to the second group.

Further, the devices included in the second group change their phases by applying the existing function $F(\Phi(t_{event}))$ without change when they detect a second synchronization signal corresponding to the second group, and change their phases by applying a function $F(\Phi(t_{event}+T_{offset}))$, which reflects a value $T_{offset}$ obtained by subtracting the time point for the second group phase value from the time point for the first group phase value, when they detect a first synchronization signal corresponding to the first group. Finally, the phases of both of the fourth and fifth devices D and E converge in such a manner that the time point for the generation of the second synchronization signals of the fourth and fifth devices D and E included in the second group is located at the second time point, which is spaced by $T_{offset}$ from the time point at which the first to third devices A, B, and C included in the first group generate their first synchronization signals, as illustrated in FIG. 4C. In other words, the devices are converged such that a time difference corresponding to a phase difference obtained by subtracting the phase value of the fourth and fifth devices D and E included in the second group from the phase value of the first to third devices A, B, and C included in the first group becomes equal to $T_{offset}$.

Figure 5:
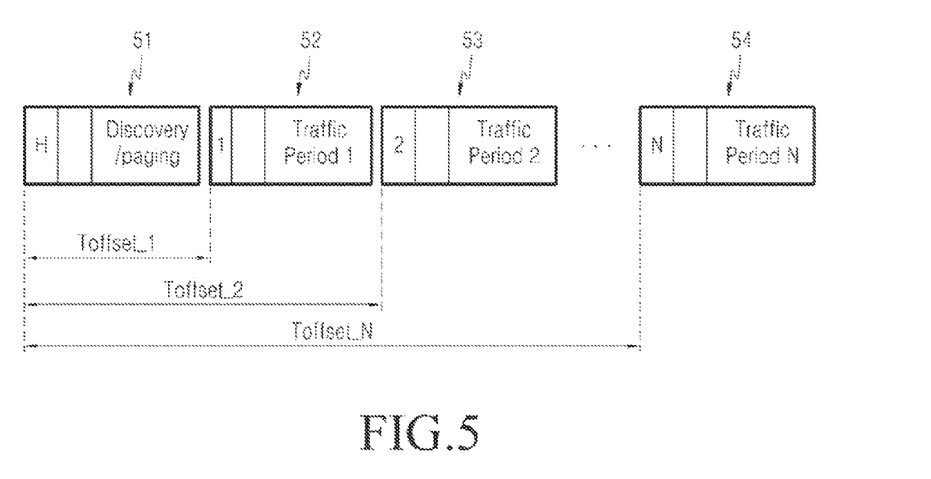
FIG. 5 is a diagram illustrating a time offset relation between groups applied to a device according to another embodiment of the present invention.

In the meantime, the frame generator 15 generates a frame according to the group information provided by the controller 11. For example, as shown in FIG. 5, when the group is a header group, the frame generator 15 generates a synchronization header frame including information for performing a paging or a discovery procedure, or a synchronization signal header. Otherwise, the frame generator 15 generates a first frame including a first traffic section and a first synchronization signal when the group is the first group, a second frame including a second traffic section and a second synchronization signal when the group is the second group, or an $n^{th}$ frame including an $n^{th}$ traffic section and an $n^{th}$ synchronization signal when the group is an $n^{th}$ group.

Furthermore, the synchronization controller 13 sets $T_{offset}$ based on the header group. More specifically, the header group and the first group have a difference of a first offset $T_{offset\_1}$ between them, the header group and the second group have a difference of a second offset $T_{offset\_2}$ between them, and the header group and an $n^{th}$ group have a difference of an $n^{th}$ offset $T_{offset\_n}$ between them. Further, if the synchronization controller 13 of the header group receives a synchronization signal of the first group, a phase difference of $-\Phi(T_{offset1})$ corresponding to a minus first offset $-T_{offset\_1}$ is applied to the current phase value. If the synchronization controller 13 of the header group receives a synchronization signal of the header group, a value obtained by adding a phase difference $\Phi(T_{offset1})$ corresponding to the first offset $T_{offset\_1}$ to the current phase value is applied.

As described above, the synchronization controller 13 generates and transmits synchronization signals, types of which are set by the controller 11. Further, the synchronization controller 13 performs an In-Phase synchronization between devices belonging to the same group while performing an Out-Of-Phase synchronization between devices belonging to different groups. As a result, in contrast the case where only one synchronization signal is used, the synchronization signal reception probability is increased to enable a more robust synchronization.

Figure 6:
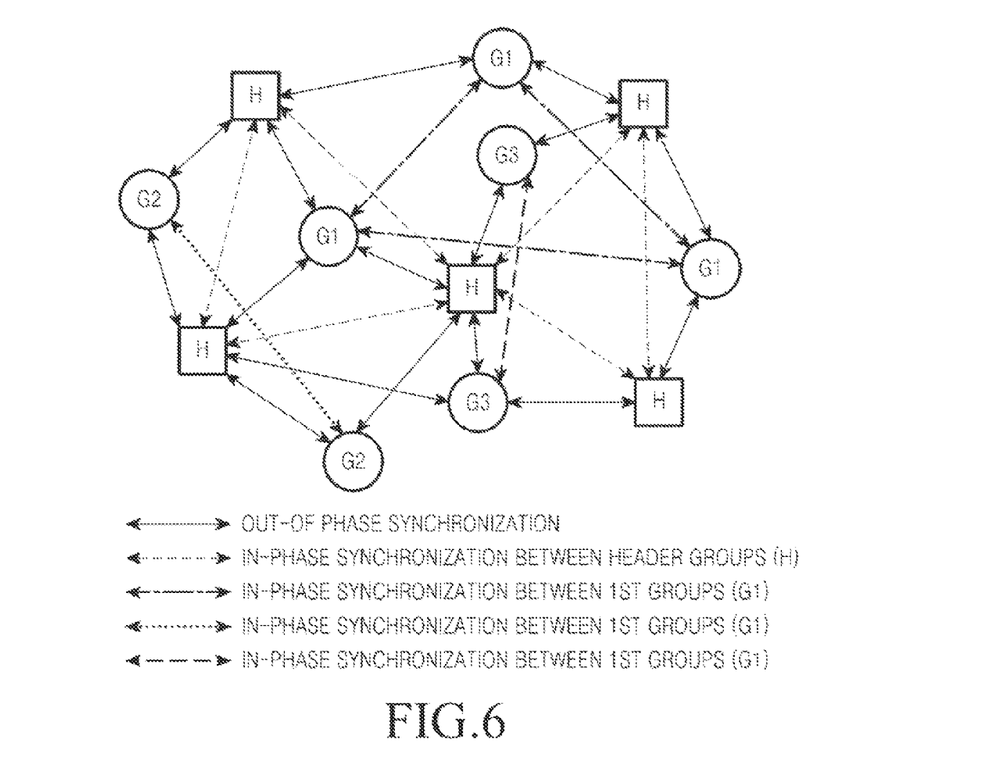
FIG. 6 is a diagram illustrating an example of a network in which a device performs synchronization according to an embodiment of the present invention.

FIG. 6 is a diagram illustrating an example of a network in which a device performs according to an embodiment of the present invention.

Referring to FIG. 6, devices H included in a header group, devices G1 included in a first group, devices G2 included in a second group, and devices G3 included in a third group are distributed in the network. The devices G1 included in the first group, the devices G2 included in the second group, and the devices G3 included in the third group distributed in the network perform synchronization with the devices H included in the header group through an Out-Of-Phase synchronization, and perform data transmission and reception based on the synchronization. Further, in the synchronization performed by the devices H included in the header group, the devices G1 included in the first group, the devices G2 included in the second group, and the devices G3 included in the third group, devices in each group independently perform the synchronization with respect to the other groups through an In-Phase synchronization, and perform data transmission and reception based on the synchronization. As a result, a probability of failing to receive a synchronization signal due to use of a synchronization signal from a device belonging to another group is reduced, which enables a more robust synchronization.

Figure 7:
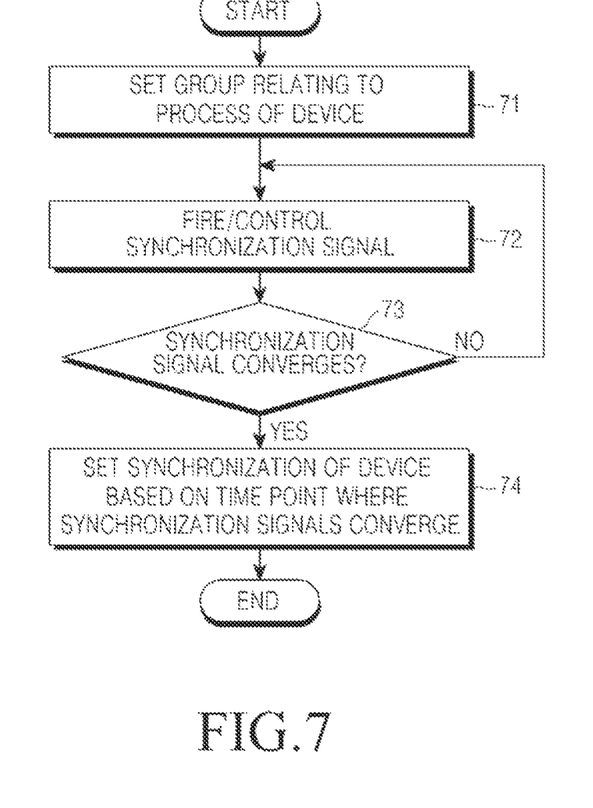
FIG. 7 is a flowchart illustrating a process of performing synchronization by a device according to an embodiment of the present invention.

FIG. 7 is a flowchart illustrating a process of performing synchronization by a device according to an embodiment of the present invention.

Referring to FIG. 7, a method of performing synchronization by the device according to an embodiment of the present invention includes setting a group of the device relating to processes of the device, in step 71. For example, a output synchronization signal output from the device may be set as a synchronization signal header, a first group synchronization signal, a second group synchronization signal, a third group synchronization signal, . . . , or an $N^{th}$ group synchronization signal. Further, the process of the device may be set in consideration of one or more combinations of interference information, QoS, and a service provided by the device.

In step 72, the device generates and transmits the synchronization signal set according to the set group type. More specifically, the device calculates a phase value of the synchronization signal according to a passage of time calculated based on a phase-to-time function set for outputting of the synchronization signal. When the calculated phase value of the synchronization signal exceeds the phase value set in advance for outputting of the synchronization signal, the device outputs the synchronization signal at a time point at which the calculated phase value exceeds the preset phase value. In this event, different synchronization signals are generated so that each output phase signal corresponds to one of the set group types. Moreover, when another synchronization signal from another device adjacent to the device is received, the outputting of the synchronization signal is controlled by applying a time offset according to a relation between the group that includes the device and a group that includes the another device, in response to the reception of the another synchronization signal from the another device.

Through the process described above, the synchronization signals of the devices included in the network are repeatedly output. Finally, the time points at which the synchronization signals of the devices included in the network are output converge on a time point. Therefore, in step 73, the device determines whether the time point for outputting of the synchronization signals has converged on a time point. More specifically, the device determines whether a synchronization signal is output at a converged time point, without receipt of any signal of the same type as that of the currently output synchronization signal from another device adjacent to a current device until outputting of a synchronization signal of a next cycle. Upon a determination the time point for outputting of the synchronization signals has not yet converged on a time point in step 73, the process returns to step 72.

Upon a determination that the time point for outputting of the synchronization signals has converged on a time point in step 73, the process proceeds to step 74, in which the synchronization of the device is set based on the converged time point.

Although, the above-described method of performing synchronization according to an embodiment of the present invention with reference to FIG. 7 is based on an example of synchronization in which the device which is constantly included in the network, embodiments of the present invention are not limited to the above-described example, and may be applied to other methods of performing synchronization according to the system environment. For example, the operation described above with reference to FIG. 7 may not be appropriate in order to maintain smooth operation for an already converged device, when a new device participates in the network or when a device withdraws from the network. Therefore, the determination of whether the synchronization has been converged may be performed by determining whether an operation of a next system in a converged situation is normal, instead of determining the synchronization signals of other devices. For example, a discovery operation according to a predetermined frame structure may be performed after transmission of a synchronization signal. In this event, the inter-discovery will be successful between synchronized devices, which enables a smooth shift to a next process. Therefore, in such cases, step 73 in FIG. 7 may be omitted in accordance with embodiments of the present invention.

Figure 8:
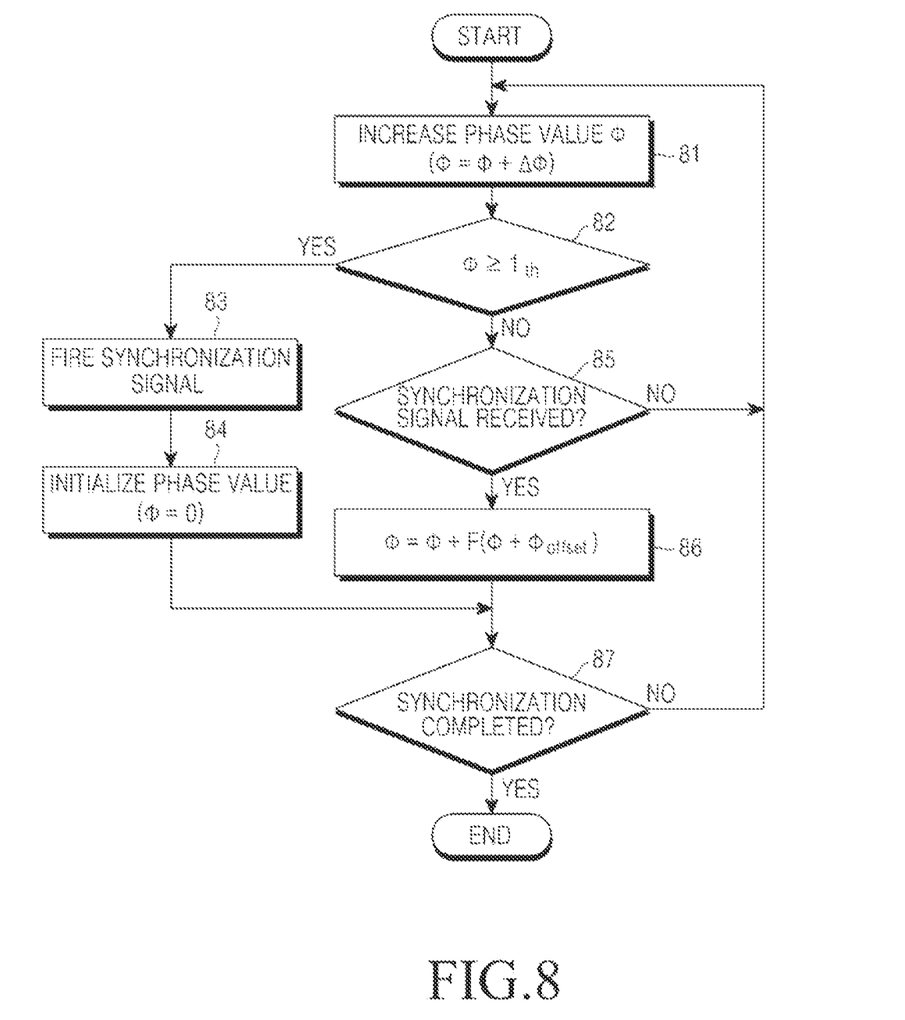
FIG. 8 is a flowchart illustrating a method in which a device generates and controls a synchronization signal according to an embodiment of the present invention.

FIG. 8 is a flowchart illustrating a method of generating and controlling a synchronization signal by a device according to an embodiment of the present invention. In the example of FIG. 8, the generation and control of a synchronization signal may be performed through use of an analog oscillator.

Referring to FIG. 8, first, in step 81, a phase value $\Phi$ increases from a previously identified phase value $\Phi$ by an increment $\Delta\Phi$ according to passage of time.

In step 82, the device determines whether the increased phase value $\Phi$ in step 81 exceeds a threshold value $\Phi_{Th}$, which is set in advance, for outputting of the synchronization signal. Since, according to the present example, an analog oscillator is used to generate and control the synchronization signal and the threshold value $\Phi_{Th}$ is 1, the increment $\Delta\Phi$ may be set to $1/T$ ($\Delta\Phi=1/T$).

When the increased phase value $\Phi$ in step 81 exceeds the threshold value $\Phi_{Th}$, the process proceeds to step 83, in which a synchronization signal is output. Then, the phase value $\Phi$ is initialized, in step 84, and then, in step 87, the device determines whether synchronization is completed.

By contrast, when the increased phase value $\Phi$ in step 81 does not exceed the threshold value $\Phi_{Th}$, the device proceeds to step 85 and waits for reception of a synchronization signal. Then, upon a determination that another synchronization signal is received from another device in step 85, step 86 is performed. However, upon a determination that another synchronization signal is not received from the another device, the process returns to step 81.

In step 86, a phase offset value $\Phi_{offset}$ is applied to the phase value $\Phi$. More specifically, according to Equation 1 below, a function applying a phase offset value $\Phi_{offset}$ is added to the phase value $\Phi$ at the time point where the another synchronization signal from the another device is received.

$$\Phi=\Phi=F(\Phi+\Phi_{offset}) \quad (1)$$

Because, in the present example, the applied phase offset value $\Phi_{offset}$ is a value measured by an analog oscillator, the applied phase offset value $\Phi_{offset}$ is a value oscillating between 0 and 1. For example, in a state where the current phase value $\Phi$ is 0.7 ($\Phi=0.7$), if a solution of a function applying an offset value $\Phi_{offset}$ to the phase value $\Phi$ ($F(\Phi+\Phi_{offset})=0.5$) is added to the phase value $\Phi$, the resultant value (i.e., the sum) is 1.2, which exceeds 1. However, the resultant value is set to 0.2.

In step 87 the device determines whether synchronization is completed, such that steps 81 to 86 to be repeatedly performed until the synchronization between the devices included in the network is completed. If the synchronization between the devices included in the network is completed, the process terminates.

According to some embodiments of the present invention, the synchronization between the devices can only be maintained when the devices always participate in the synchronization process. However, according to other embodiments of the present invention, some devices may be allowed to temporarily stop outputting the synchronization signal. However, this temporary stop is permitted, when there performance is not degraded. Basically, a cease of outputting of the synchronization signal allowed when a device does not continue to participate in a network after previously participating in the synchronization process.

Figure 9:
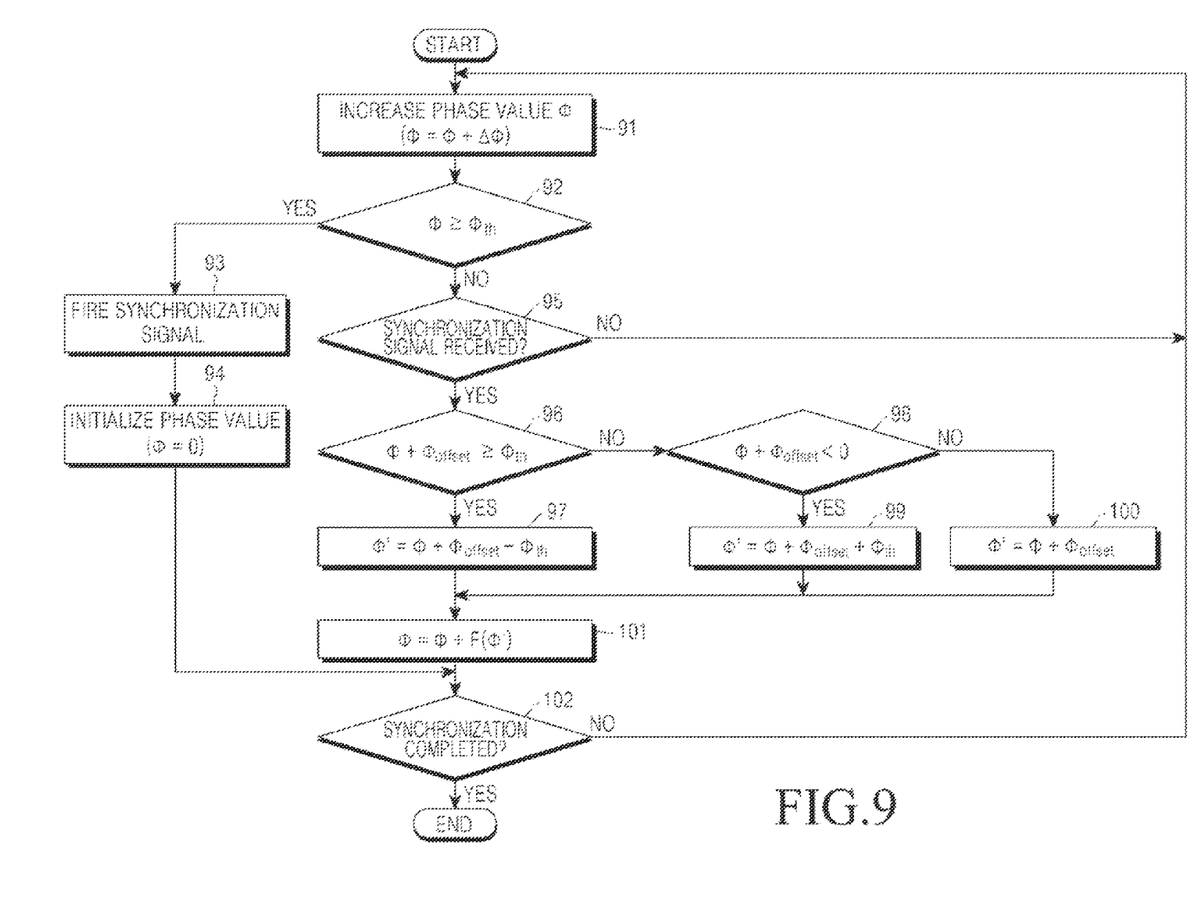
FIG. 9 is a flowchart illustrating a method in which a device generates and controls a synchronization signal according to another embodiment of the present invention.

FIG. 9 is a flowchart illustrating a method in which a device generates and controls a synchronization signal according to another embodiment of the present invention. In the example according to FIG. 7, a digital counter may generate and control a synchronization signal.

Referring to FIG. 9, first, in step 91, a phase value $\Phi$ is adjusted by adding an increment $\Delta\Phi$, according to passage of time, to a previously identified phase value $\Phi$. In the example of FIG. 9, since the value $\Phi_{Th}$ is a value specified by a digital counter, $\Delta\Phi=\Phi_{Th}/T$ (T indicates a time having a length of one cycle).

In step 92, the device determines whether the increased phase value $\Phi$ in step 91 exceeds a threshold value $\Phi_{Th}$, which is set in advance, for outputting of the synchronization signal. When the increased phase value $\Phi$ in step 91 exceeds the threshold value $\Phi_{Th}$, the process proceeds to step 93, in which a synchronization signal is generated. In step 94, the phase value $\Phi$ is initialized, and then the process proceeds to step 102, where the device determines whether synchronization is completed.

By contrast, when the increased phase value $\Phi$ set in step 91 does not exceed the threshold value $\Phi_{Th}$, the device proceeds to step 95 and waits for reception of a synchronization signal. Upon a determination that another synchronization signal from another device is received in step 95, the process proceeds to step 96. However, upon a determination that another synchronization signal from the another device is not received in step 95, the process returns to step 91.

In step 96, a phase offset value $\Phi_{offset}$ is added to the phase value $\Phi$, and the device determines whether the sum obtained by adding the phase offset value $\Phi_{offset}$ to the phase value exceeds a preset threshold value $\Phi_{Th}$. Upon a determination that the sum obtained by adding the phase offset value $\Phi_{offset}$ to the phase value exceeds the threshold value $\Phi_{Th}$, the process proceeds to step 97. However, upon a determination that the sum obtained by adding the phase offset value $\Phi_{offset}$ to the phase value does not exceed the threshold value $\Phi_{Th}$, the process proceeds to step 98.

In step 97, according to Equation 2 below, the phase value $\Phi$ is reset by adding the phase offset value $\Phi_{offset}$ to the phase value $\Phi$ and then applying the threshold value $\Phi_{Th}$. In Equation 2, $\Phi'$ indicates a reset phase value.

$$\Phi'=\Phi'\Phi_{offset}-\Phi_{th} \quad (2)$$

When the sum obtained by adding the phase offset value $\Phi_{offset}$ to the phase value exceeds the threshold value $\Phi_{Th}$ set in advance for outputting of the synchronization signal, the phase value exceeds the threshold value $\Phi_{Th}$. Therefore, in step 97, the reset phase value is obtained by subtracting the threshold value $\Phi_{Th}$ set in advance for outputting of the synchronization signal from the sum obtained by adding the phase offset value $\Phi_{offset}$ to the phase value $\Phi$.

In step 98, the phase offset value $\Phi_{offset}$ is added to the phase value $\Phi$, and the device determines whether the sum obtained by adding the phase offset value $\Phi_{offset}$ to the phase value is less than 0. When the sum ($\Phi+\Phi_{offset}$) obtained by adding the phase offset value $\Phi_{offset}$ to the phase value is less than 0, the process proceeds to step 99. However, when the sum ($\Phi+\Phi_{offset}$) obtained by adding the phase offset value $\Phi_{offset}$ to the phase value is at least equal to 0, the process proceeds to step 100.

In step 99, according to Equation 3 below, the phase value Φ is reset by adding the phase offset value $Φ_{offset}$ to the phase value Φ and then applying the threshold value $Φ_{Th}$. In Equation 3, Φ' indicates a reset phase value.

$$Φ'=Φ+Φ_{offset}+Φ_{th} \quad (3)$$

When the sum obtained by adding the phase offset value $Φ_{offset}$ to the phase value Φ does not exceed the threshold value $Φ_{Th}$ set in advance for outputting of the synchronization signal, the reset phase value is obtained by adding the threshold value $Φ_{Th}$ to the sum obtained by adding the phase offset value $Φ_{offset}$ to the phase value Φ, in step 99.

The phase offset value $Φ_{offset}$ is a phase offset value corresponding to a desired time offset value $T_{offset}$ from a real time. For example, when a time offset set when a device included in the synchronization signal header group receives a synchronization signal from a device included in the first group is $T_{offset\_1}$, the phase offset value $Φ_{offset}$ may be set according to Equation 4 below. When a device included in the first group receives a synchronization signal from a device included in the synchronization signal header group, the phase offset value $Φ_{offset}$ may be set according to Equation 5 below.

$$Φ_{offset}=(T_{offset}1/T)*Φ_{th} \quad (4)$$

$$Φ_{offset}=(-T_{offset}1/T)*Φ_{th} \quad (5)$$

In step 100, the sum obtained by adding the phase offset value $Φ_{offset}$ to the phase value Φ is set as the value of Φ' (Φ'=Φ+$Φ_{offset}$).

In step 101, as further described herein with reference to FIG. 6, the phase value is calculated by applying the reset phase value Φ' calculated in step 97, 99, or 100 to an input of a predetermined function F(x) for the phase-to-time and then adding the solution of the function to the phase value Φ, according to Equation 6 below.

$$Φ=Φ+F(Φ') \quad (6)$$

In step 102 the device determines whether synchronization is completed. If synchronization is not yet completed steps 91 to 101 described above are repeated until the synchronization between the devices included in the network is completed. If the synchronization between the devices included in the network is completed, the process terminates.

A method and an apparatus according to embodiments of the present invention can effectively perform synchronization between devices without using a separate module for receiving time information from devices (e.g., a synchronous evolved Node B, GPS, etc.) included in another system.

Further, a method and an apparatus according to embodiments of the present invention can perform synchronization for each group by performing an In-Phase synchronization between devices belonging to the same group while performing an Out-Of-Phase synchronization between devices belonging to different groups. As a result, methods and apparatuses according to embodiments of the present invention can implement a structure of a frame reflecting functions of respective groups in a distributed manner.

Moreover, embodiments of the present invention enable receipt of synchronization signals from devices belonging to other groups, which can increase the number of times synchronization signals are received, and therefore, devices can perform a more robust synchronization.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A method performed by a first device for performing synchronization of time between devices for a Device-to-Device (D2D) communication, the method comprising:
    setting the first device to a first group based on at least one of interference information, Quality of Service (QoS), and a service type;
    outputting a first synchronization signal corresponding to the first group as a signal for setting synchronization time;
    if a second synchronization signal is received from a second device in a second group, controlling the outputting of the first synchronization signal by applying a time offset according to a relation between the first group and the second group; and
    if the first synchronization signal and the second synchronization signal are converged at one time, setting a time for synchronization of the first device with the second device as a time point where the first synchronization signal is output.

2. The method of claim 1, wherein setting the time for synchronization of the first device with the second device comprises:
    if the first synchronization signal and the second synchronization signal are converged on a first time point, setting the first time point as the time point where the first synchronization signal is output.

3. The method of claim 1, wherein setting the time for synchronization of the first device with the second device further comprising:
    calculating a phase value based on a phase change value according to a time set for outputting of the first synchronization signal; and
    if the calculated phase value is greater than or equal to a phase threshold value preset for outputting of the first synchronization signal, controlling outputting of the first synchronization signal at a time point where a phase of the first synchronization signal exceeds the phase threshold value.

4. The method of claim 3, wherein calculating the phase value comprises:
    identifying a group type of the second synchronization signal;
    determining whether to perform a synchronization control according to the relation between the first group and the second group;
    when performing the synchronization control, identifying a time offset according to the relation between the first group and the second group; and
    controlling the phase of the first synchronization signal in consideration of the time offset.

5. The method of claim 4, wherein controlling the phase of the first synchronization signal comprises:
    identifying a sum obtained by adding a phase offset corresponding to the time offset and a phase at a time point where the second synchronization signal is received.

6. The method of claim 5, further comprising:
    determining a phase value by applying the sum to a phase variance according to the relation between the first group and the second group.

7. The method of claim 5, further comprising:
    determining whether the sum has a value at least equal to the phase threshold value; and     if the sum has a value at least equal to the phase threshold value, determining a resultant phase value by subtracting the phase threshold value from the sum.

8. The method of claim 7, further comprising:
    if the sum is less than the phase threshold value, determining whether the sum is less than 0; and
    if the sum is less than 0, determining the resultant phase value by adding the phase threshold value to the sum.

9. The method of claim 7, further comprising:
    if the sum is less than the phase threshold value, determining whether the sum is less than 0; and
    if the sum is at least equal to 0, determining the sum as the resultant phase value.

10. The method of claim 1, wherein setting the device to the first group comprises setting the first device to the first group according to a function currently performed by the first device.

11. A first device for performing a Device-to-Device (D2D) communication, the first device comprising:
    a controller configured to set the first device to a first group based on at least one of interference information, Quality of Service (QoS), and a service type; and
    a synchronization controller configured to:
        output a first synchronization signal corresponding to the first group as a signal for setting synchronization time,
        if a second synchronization signal is received from a second device in a second group, control the outputting of the first synchronization signal by applying a time offset according to the relation between the first group and the second group, and
        if the first synchronization signal and the second synchronization signal are converged at one time, setting a time for the synchronization of the first device with the second device as a time where the first synchronization signal is output.

12. The first device of claim 11, wherein,
    if the first synchronization signal and the second synchronization signal are converged on a first time point, the synchronization controller sets the first time point as the time point where the first synchronization signal is output.

13. The first device of claim 11, wherein the synchronization controller calculates a phase value based on a phase change value according to the time set for outputting of the first synchronization signal, and controls outputting of the first synchronization signal at a time point where the calculated phase value exceeds the phase threshold value if the calculated phase value is greater than or equal to a phase threshold value preset for outputting of the first synchronization signal.

14. The first device of claim 11, wherein, the synchronization controller identifies a group type of the second group by using the second synchronization signal, determines whether to perform a synchronization control according to the relation between the first group and the second group, identifies a time offset according to the relation between the first group and the second group when performing the synchronization control, and controls a phase of the first synchronization signal in consideration of the time offset.

15. The first device of claim 14, wherein the synchronization controller identifies a sum obtained by adding a phase offset corresponding to the time offset and a phase at a time point where the second synchronization signal from the second device is received.

16. The first device of claim 15, wherein the synchronization controller determines a phase value by applying the sum to a phase variance according to the relation between the first group and the second group.

17. The first device of claim 16, wherein, the synchronization controller determines whether the sum is at least equal to the phase threshold value, and determines a resultant phase value by subtracting the phase threshold value from the sum if the sum is at least equal to the phase threshold value.

18. The first device of claim 17, wherein, if the sum is less than the phase threshold value, the synchronization controller determines whether the sum is less than 0, and if the sum is less than 0, the synchronization controller determines the resultant phase value by adding the phase threshold value to the sum.

19. The first device of claim 17, wherein,
    if the sum is less than the phase threshold value, the synchronization controller determines whether the sum is less than 0, and
    if the sum is at least equal to 0, the synchronization controller determines the sum as the resultant phase value.

\* \* \* \* \*